Nov. 25, 1930.  L. L. JOHNSON  1,782,965
AEROPLANE
Filed Oct. 29, 1929

INVENTOR.
Lawrence L. Johnson
BY
Robt. D. Pearson
ATTORNEY.

Patented Nov. 25, 1930

1,782,965

UNITED STATES PATENT OFFICE

LAWRENCE L. JOHNSON, OF LOS ANGELES, CALIFORNIA

AEROPLANE

Application filed October 29, 1929. Serial No. 403,239.

This invention relates to an improved wing-control for aeroplanes, and safety device designed to operate somewhat as a parachute to prevent a precipitate descent of the machine as a whole in case of accident.

An object of the invention is to provide a wing-control whereby the relative positions of a plurality of wings may be readily changed to the extent desired, to suit the requirements of flying for the purpose of causing the machine to ascend and to descend and also make it possible to so adjust the wings as to make a safer and smoother landing.

Another object of the invention is to provide a wing construction subject to dependable manual control whereby the wings may be quickly shifted from the flying position to a position for acting as a parachute to safeguard the machine against too rapidly descending in case a forced landing becomes necessary.

A still further object of the invention is to provide a propeller construction which combines with the wing construction to increase the efficiency of the lifting power of the wings.

Other objects and advantages may hereinafter appear.

Referring to the accompanying drawings which illustrate what is at present deemed to be a preferred embodiment of the invention.

Figure 1:
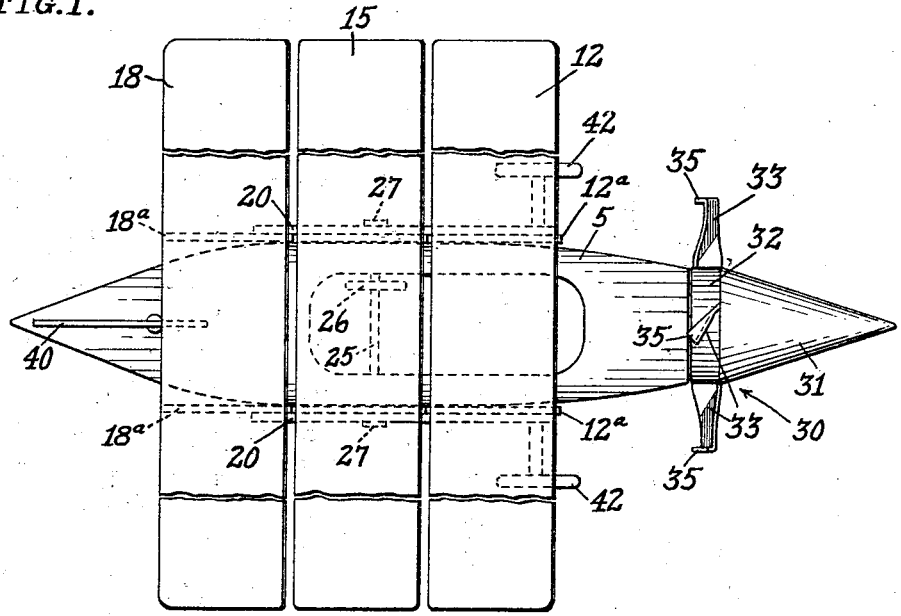
Fig. 1 is a plan view of the complete device, portions of wings intermediate their length being broken away to contract the view.
Figure 2:
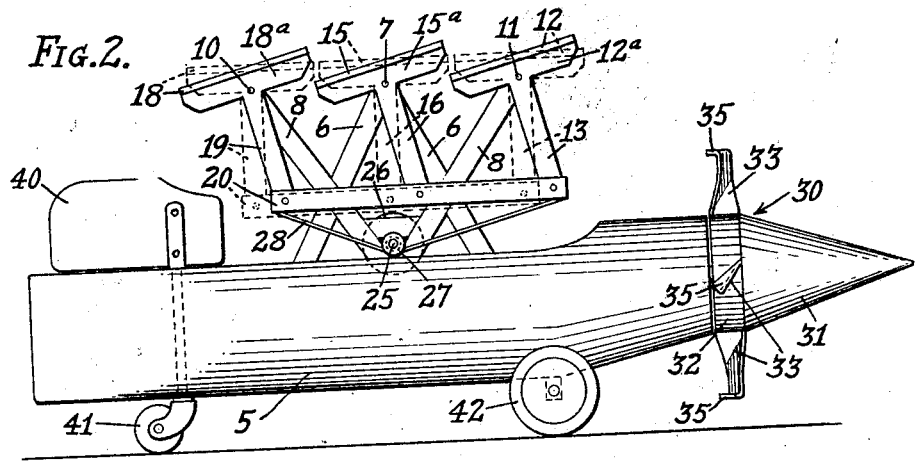
Fig. 2 is a side elevation.

Referring in detail to the drawings, upon the fuselage 5 is mounted a double wing-supporting frame consisting at each side of the two inclined converging trusses 6 secured together at their top to support the pivot shaft 7, and the diverging trusses 8 which intersect said trusses 7 and are secured to the latter trusses in any desired manner, the relative arrangement of these trusses 6 and 8 being well shown in Fig. 2.

The frame which has just been described, at each side of the fuselage provides three spaced supports which support not only the central shaft 7 but also the rear shaft 10 and the front shaft 11. Each of these shafts forms a wing-support, said shaft 11 pivotally supporting at its mid-width the front wing 12, said wing 12 being attached in fixed relation to the operating stem or arm 13, so that said wing, together with its operating arm forms a T shaped member. The central wing 15 is likewise provided with an operating stem or arm 16 fixed thereto, and the rear wing 18 is provided with the operating stem or arm 19 fixed thereto. The wings 12, 15 and 18 are respectively provided along their under sides with pairs of cross pieces 12ª, 15ª and 18ª to which are respectively rigidly secured their operating arms 13, 16 and 19. To the lower ends of each of these operating arms 13, 16, and 19 is pivotally attached at each side of the fuselage a common cross bar or line 20 whereby said arms together with the wings to which they are attached, will operate in unison in the manner which will next be described.

Upon the fuselage 5 is mounted a control shaft 25, between the ends of which is secured a hand wheel 26 and to each end of which is secured a sheave 27. Around said sheaves 27 is passed one or more turns of an operating connection 28. Said operating connections each being at one end connected to the rear end of a cross bar 20 and its other end being connected to the front end of said cross bar.

The aeroplane is provided with a propeller 30 which consists of a cone cowl 31 having a short cylindrical base portion 32 upon which is mounted a series of propelling blades 33, four of such propelling blades being shown in the drawings. Each of said propelling blades consists of a strip of metal which is twisted in such a maner as to adapt it to effectively perform its function, being also provided with a backwardly directed tip portion 35 which is designed to keep the air current from being directed radially and causing it instead to be directed toward the wings in such a manner as to cause them more effectively to perform their lifting function.

The fuselage is also provided with a rudder 40, and with a swiveled gear ground wheel 41 and front ground wheels 42.

In the operation of the craft the wings are adjusted to approximately the position shown in full lines in Fig. 2 preparatory to taking to the air. During rapid flight said wings are adjusted more or less toward the horizontal position indicated in dotted lines in said view.

In order to make a smoother landing the wings are adjusted to the proper angle of incidence for causing the craft to encounter the landing surface as gently as possible, and then immediately upon contact of the ground wheels with the field the wings are adjusted through the horizontal position more or less into the reverse position to that shown in full lines in Fig. 2, thus producing an additional downward pressure upon the ground wheels to prevent any bouncing movements of the craft.

If the craft becomes disabled during flight so that a landing cannot be effected in the usual manner, the wings are adjusted to the horizontal position in order that they may function similarly to a parachute and thus retard the speed of descent sufficiently to prevent a disastrous fall.

Claims:

1. In an aeroplane, a frame consisting of a pair of upwardly converging trusses and a pair of upwardly diverging trusses, said trusses being secured to the fuselage and extending upwardly therefrom in fixed relation to each other thus forming three shaft supports spaced apart from each other with respect to the length of the craft, a wing extending crosswise of the shaft and pivotally secured to each of said supports, and means for adjusting in unison the angle of incidence of said wings.

2. In an aeroplane, a frame consisting of a pair of upwardly converging trusses and a pair of upwardly diverging trusses, said trusses being secured to the fuselage and extending upwardly therefrom in fixed relation to each other thus forming three supports spaced apart from each other with respect to the length of the craft, and a wing extending crosswise of the shaft and pivotally secured to each of said supports.

3. In an aeroplane, a plurality of wings mounted upon pivot shafts in spaced relation to each other with respect to the length of the craft, each of said wings being provided with an operating extension therebeneath and in fixed relation thereto, a cross bar common to said extensions pivotally secured to each of them, a sheave located between the ends of said cross bar and spaced therebelow, a flexible operating connection leading from said sheave fore and aft to said cross bar, and means to rotate said sheave to adjust said wings in unison.

In testimony whereof I hereunto affix my signature.

LAWRENCE L. JOHNSON.